United States Patent
Zhou et al.

(10) Patent No.: US 10,558,309 B2
(45) Date of Patent: *Feb. 11, 2020

(54) ARRAY SUBSTRATE, TOUCH DISPLAY PANEL AND TOUCH DISPLAY DEVICE

(71) Applicants: SHANGHAI TIANMA MICRO-ELECTRONICS CO., LTD., Shanghai (CN); TIANMA MICRO-ELECTRONICS CO., LTD., Shenzhen (CN)

(72) Inventors: Xingyao Zhou, Shanghai (CN); Qijun Yao, Shanghai (CN); Lingxiao Du, Shanghai (CN); Huangyao Wu, Xiamen (CN); Yan Shen, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/031,648

(22) Filed: Jul. 10, 2018

(65) Prior Publication Data
US 2018/0321770 A1 Nov. 8, 2018

Related U.S. Application Data

(63) Continuation-in-part of application No. 15/633,402, filed on Jun. 26, 2017, now Pat. No. 10,055,040, (Continued)

(30) Foreign Application Priority Data

Apr. 1, 2015 (CN) .......................... 2015 1 0152834

(51) Int. Cl.
*G06F 3/044* (2006.01)
*G06F 3/041* (2006.01)
(Continued)

(52) U.S. Cl.
CPC .......... *G06F 3/044* (2013.01); *G02F 1/13338* (2013.01); *G02F 1/13394* (2013.01); *G06F 3/0412* (2013.01)

(58) Field of Classification Search
CPC ........ G06F 3/0412; G06F 3/044; G06F 3/041; G02F 1/13394; G02F 1/1368;
(Continued)

(56) References Cited

U.S. PATENT DOCUMENTS 9,665,222 B2 5/2017 Zhao et al.
2010/0194707 A1 8/2010 Hotelling et al.
(Continued)

FOREIGN PATENT DOCUMENTS

CN 104142772 A 11/2014

OTHER PUBLICATIONS

DE Application No. 1020151130602, 1st Office Action dated Sep. 25, 2018.

Primary Examiner — Sanjiv D. Patel
(74) Attorney, Agent, or Firm — Alston & Bird LLP

(57) ABSTRACT

The present disclosure provides a touch display panel including an array substrate, a color filter substrate and a plurality of photo spacers. The array substrate includes pixel units, a drive circuit, touch leads, and a common electrode layer. The common electrode layer is divided into columns of self-capacitive electrodes. Each touch lead is disposed parallel to and connected with one of the columns through at least two first via holes. An interval between adjacent first via holes is greater than or equal to twice the side length of one pixel unit. The first via holes connected with one touch (Continued)

lead are aligned staggered to those connected with an adjacent touch lead and none of the photo spacers overlap the first via holes in the direction perpendicular to the array substrate.

14 Claims, 12 Drawing Sheets

Related U.S. Application Data which is a continuation-in-part of application No. 14/788,688, filed on Jun. 30, 2015, now Pat. No. 9,733,741.

(51) Int. Cl.
*G02F 1/1339* (2006.01)
*G02F 1/1333* (2006.01)

(58) Field of Classification Search
CPC ..... G02F 2001/13398; G02F 1/133512; G02F 1/133514; G02F 2001/13396
See application file for complete search history.

(56) References Cited

U.S. PATENT DOCUMENTS

| | | | |
|---|---|---|---|
| 2012/0326990 A1* | 12/2012 | Wurzel | G06F 1/1658 345/173 |
| 2013/0162570 A1* | 6/2013 | Shin | G06F 3/041 345/173 |
| 2013/0342478 A1 | 12/2013 | Bae et al. | |
| 2014/0118277 A1* | 5/2014 | Kim | G06F 3/044 345/173 |
| 2015/0338951 A1* | 11/2015 | Lee | G06F 3/044 345/174 |
| 2016/0026291 A1 | 1/2016 | Zhao et al. | |
| 2016/0246408 A1* | 8/2016 | Wang | G06F 3/044 |
| 2018/0011573 A1* | 1/2018 | Yu | G02F 1/133345 |

* cited by examiner

ARRAY SUBSTRATE, TOUCH DISPLAY PANEL AND TOUCH DISPLAY DEVICE

This application is a continuation-in-part of U.S. application Ser. No. 15/633,402 filed on Jun. 26, 2017, which is a continuation-in-part of U.S. application Ser. No. 14/788,688 filed on Jun. 30, 2015, now U.S. Pat. No. 9,733,741, which claims priority to Chinese Patent Application No. CN201510152834.9, filed on Apr. 1, 2015 and entitled "ARRAY SUBSTRATE, TOUGH DISPLAY PANEL AND TOUCH DISPLAY DEVICE". All of the aforementioned applications are hereby incorporated by reference in their entireties.

FIELD OF THE INVENTION

The disclosure generally relates to the field of touch technique, and in particular to an array substrate, a touch display panel and a touch display device.

BACKGROUND OF THE INVENTION

Capacitive touch panels can be classified into two types, i.e., self-capacitive and mutual capacitive based on detection method of the capacitor. Touch display devices can be classified into three types, i.e., in-cell, on-cell and out-cell based on relative position of panels, touch panels and display panels. The in-cell touch panel has become an important development trend in touch technology due to its advantages of high integration, thin profile and prominent performance, etc.

Currently, existing touch display devices mainly employ in-cell mutual capacitive touch technology. However, there are problems such as poor waterproof property, low report rate, and poor suspension property in the in-cell mutual capacitive touch technology, and two separate drive circuits are respectively required for electrodes of the display panel and touch electrodes of the touch panel in the touch display device, thereby a cost of the touch display device is high.

Based on this, it has also been provided an in-cell self-capacitive touch technology according to the conventional art to solve the problems of high cost, poor waterproof property, low report rate, and poor suspension property in the in-cell mutual capacitive touch technology. According to the in-cell self-capacitive touch technology, a common electrode layer on the array substrate is also used as touch electrodes, and the touch electrodes are connected to a drive circuit of the array substrate through touch leads. However, via holes via which the touch leads are electronically connected to the touch electrodes may cause a problem such as visible streaks in screen display.

BRIEF SUMMARY OF THE INVENTION

One inventive aspect is an array substrate. The array substrate includes a plurality of touch leads, a common electrode layer, and a drive circuit, where the common electrode layer is divided into a plurality of self-capacitive electrodes, and where the self-capacitive electrodes are electronically connected to the drive circuit through the touch leads. The array substrate also includes a plurality of pixel units. Each touch lead is electronically connected to the self-capacitive electrode corresponding to the touch lead via a first via hole. At least one of the touch leads is continuous and passes through a whole column of the self-capacitive electrodes. In a direction perpendicular to the array substrate, a projection of the self-capacitive electrode covers projections of a plurality of pixel units. In addition, along a direction of the touch leads, an interval between two adjacent first via holes is greater than or equal to a length of two pixel units.

Another inventive aspect is a touch display panel including an array substrate. The array substrate includes a plurality of touch leads, a common electrode layer, and a drive circuit, where the common electrode layer is divided into a plurality of self-capacitive electrodes, and where the self-capacitive electrodes are electronically connected to the drive circuit through the touch leads. The array substrate also includes a plurality of pixel units. Each touch lead is electronically connected to the self-capacitive electrode corresponding to the touch lead via a first via hole. At least one of the touch leads is continuous and passes through a whole column of the self-capacitive electrodes. In a direction perpendicular to the array substrate, a projection of the self-capacitive electrode covers projections of a plurality of pixel units. In addition, along a direction of the touch leads, an interval between two adjacent first via holes is greater than or equal to a length of two pixel units.

Another inventive aspect is a touch display device including a touch display panel including an array substrate. The array substrate includes a plurality of touch leads, a common electrode layer, and a drive circuit, where the common electrode layer is divided into a plurality of self-capacitive electrodes, and where the self-capacitive electrodes are electronically connected to the drive circuit through the touch leads. The array substrate also includes a plurality of pixel units. Each touch lead is electronically connected to the self-capacitive electrode corresponding to the touch lead via a first via hole. At least one of the touch leads is continuous and passes through a whole column of the self-capacitive electrodes. In a direction perpendicular to the array substrate, a projection of the self-capacitive electrode covers projections of a plurality of pixel units. In addition, along a direction of the touch leads, an interval between two adjacent first via holes is greater than or equal to a sum of side lengths of two pixel units.

BRIEF DESCRIPTION OF THE DRAWINGS

Drawings to be used in description of embodiments or the prior art are described briefly as follows, so that the technical solutions according to the embodiments of the present invention or according to the prior art become more clear. It is apparent that the drawings in the following description are merely a few embodiments of the present invention. For those skilled in the art, other drawings may be obtained based on these drawings without any creative work.

DETAILED DESCRIPTION OF THE INVENTION

The technical solutions according to the embodiments of the present invention are described clearly and completely as follows in conjunction with the drawings in the embodiments of the present invention. Apparently the described embodiments are merely a few embodiments according to the present invention. All the other embodiments obtained by those skilled in the art based on the embodiments in the present invention and without any creative work belong to the scope of protection of the present invention.

Figure 1:
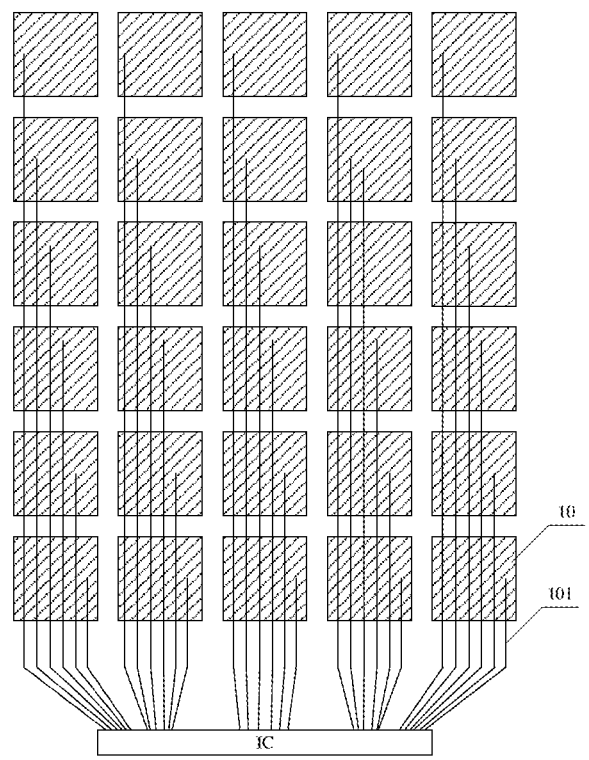
FIG. 1 is a schematic top view of a structure of an array substrate according to an embodiment of the disclosure.

It is provided an array substrate according to an embodiment of the disclosure. The array substrate includes a common electrode layer and a drive circuit IC. The common electrode layer is divided into multiple block shaped self-capacitive electrodes 10 insulated from each other. The self-capacitive electrodes 10 are electronically connected to the drive circuit IC through touch leads 101. FIG. 1 is a top view of the array substrate.

Figure 2:
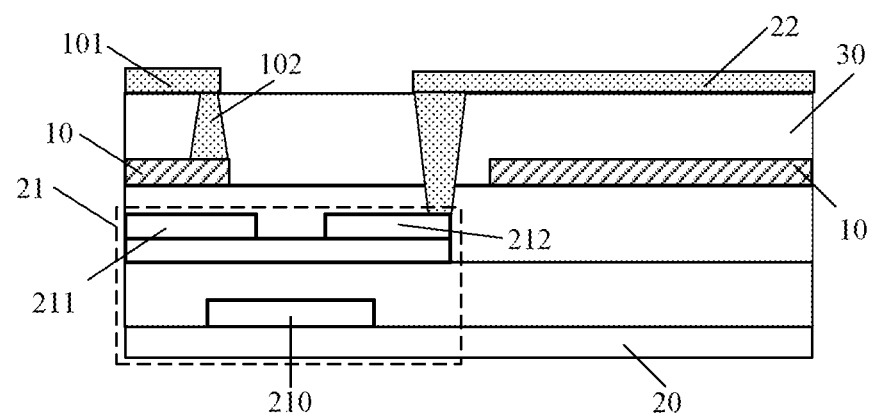
FIG. 2 is a schematic cross sectional view of a structure of an array substrate according to an embodiment of the disclosure.
Figure 3:
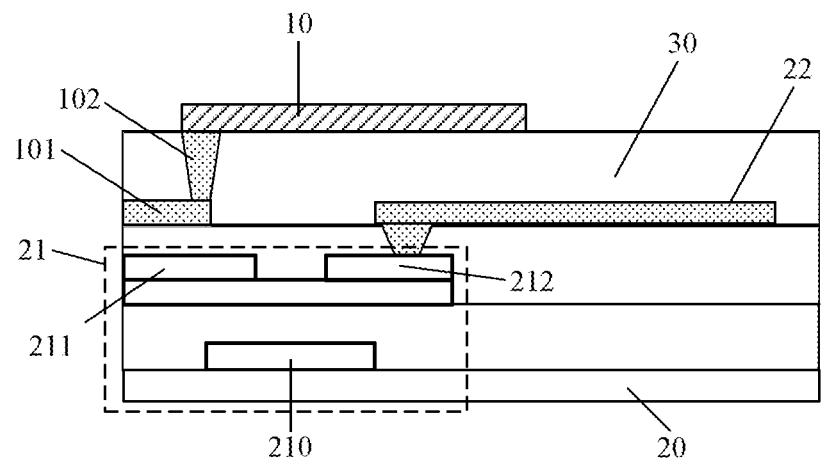
FIG. 3 is a schematic cross sectional view of a structure of another array substrate according to an embodiment of the disclosure.

As shown in FIG. 2 and FIG. 3, the array substrate according to the embodiment further includes: a glass substrate 20, multiple gate lines and multiple data lines on the glass substrate 20 and multiple pixel units (not shown) surrounded by the gate lines and the data lines. In a direction perpendicular to the array substrate, a projection of the block shaped self-capacitive electrode 10 covers a projection of multiple pixel units. The number of the pixel units whose projections are covered by the projection of the block shaped self-capacitive electrode 10 is set as desired, which is not further described herein. The pixel unit includes thin film transistor 21 and a pixel electrode 22. A gate 210 of the thin film transistor 21 is electronically connected to the gate line. A source 211 of the thin film transistor 21 is electronically connected to the data line. And a drain 212 of the thin film transistor 21 is electronically connected to the pixel electrode 22.

In the array substrate, the common electrode layer i.e. the self-capacitive electrode 10 is between the thin film transistor 21 and the pixel electrode 22. And an insulating layer 30 is between the common electrode layers i.e. the self-capacitive electrode 10 and the pixel electrode 22. FIG. 2 is a schematic cross sectional view of the structure of the array substrate. Optionally, in other embodiments of the present disclosure, as shown in FIG. 3, the pixel electrode 22 is between the thin film transistor 21 and the common electrode layer i.e. the self-capacitive electrode 10, and an insulating layer 30 is between the common electrode layers i.e. the self-capacitive electrode 10 and the pixel electrode 22. Optionally, the touch leads 101 are in a same layer with the pixel electrode 22. Certainly, the present disclosure is not limited thereto.

Figure 4:
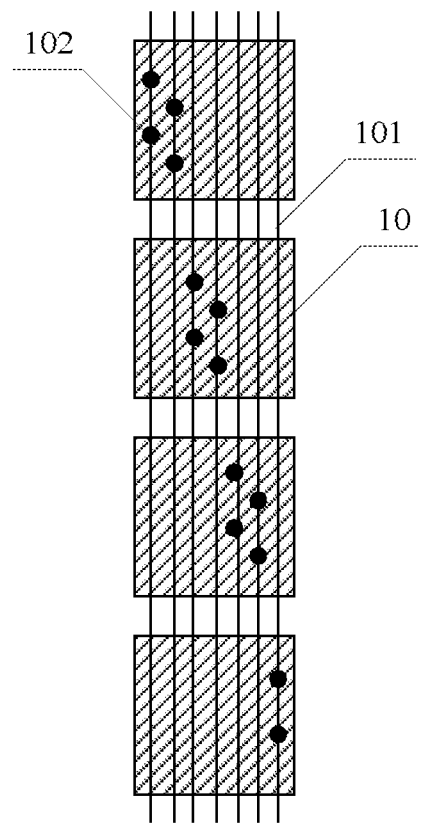
FIG. 4 is a schematic distribution diagram of first via holes in an array substrate according to an embodiment of the disclosure.
Figure 5:
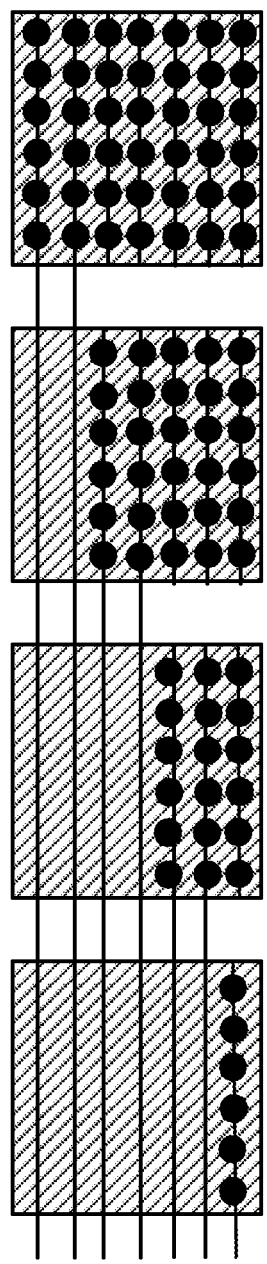
FIG. 5 is a schematic distribution diagram of first via holes in an array substrate according to the conventional art.

As shown in FIG. 2 and FIG. 3, the touch lead 101 is electronically connected to a self-capacitive electrode 10 corresponding to the touch lead 101 via a first via hole 102. As shown in FIG. 4, in the embodiment, at least one of the touch leads 101 is continuous and passes through all self-capacitive electrodes 10 along the direction of the touch leads 101, that is, a whole column of the self-capacitive electrodes 10. Optionally, all the touch leads 101 are continuous and pass through the whole column of the self-capacitive electrodes 10. The advantageous effects of above disposal are described below. In the case that a touch leads 101 is discontinuous, multiple via holes has to be disposed between the touch lead 101 and the self-capacitive electrodes 10 to electronically connect each segment of the touch lead 101 and the self-capacitive electrodes 10, and hence, too many via holes are disposed. Optionally, at least two touch leads passing through a whole column of the self-capacitive electrodes 10 are included corresponding to each column of the self-capacitive electrodes 10. In the conventional art, only one touch lead passing through a whole column of the self-capacitive electrodes 10 is included corresponding to each column of the self-capacitive electrodes 10. According to the array substrate provided here, the number of the via holes is decreased, and the problem that streaks visible to human eyes occurs in screen display is solved or alleviated. Optionally, along the direction of the touch leads, an interval between two adjacent first via holes is greater than or equal to the twice the side lengths of one pixel unit. Optionally, in a direction perpendicular to the array substrate, a projection of two adjacent first via holes 102 electronically connected to the same touch lead 101 is separated by the projection of at least two pixel units. That is, along a direction in which the touch lead 101 extends, two adjacent first via holes 102 are separated by at least two pixel units. Compared with the scheme in the conventional art in which each pixel unit has one first via hole as shown in FIG. 5, in the array substrate according to the embodiment of the disclosure, the problem that streaks visible to human eyes occurs in screen display due to a large number or high density of the first via holes 102 is solved by decreasing the number and density of the first via holes 102.

Figure 6A:
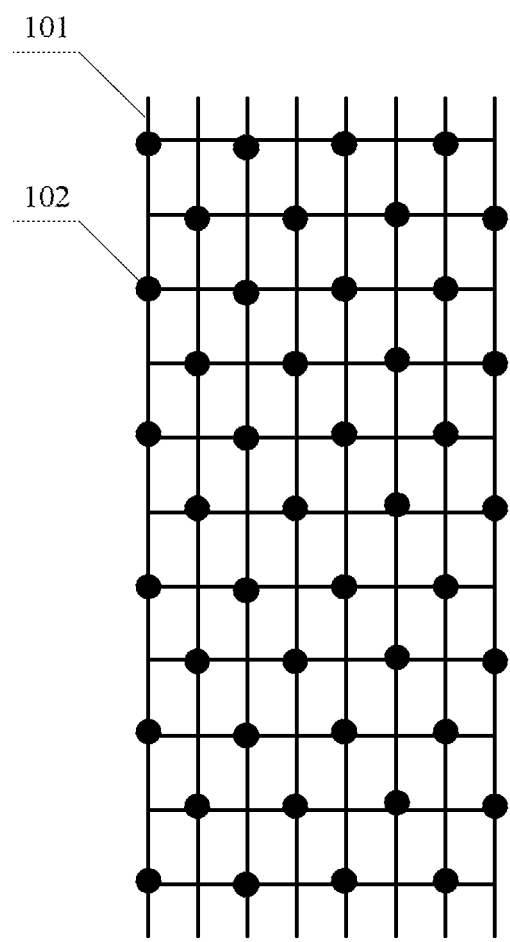
FIG. 6a is a schematic structural diagram in which the first via holes are separated by two pixel units.
Figure 6B:
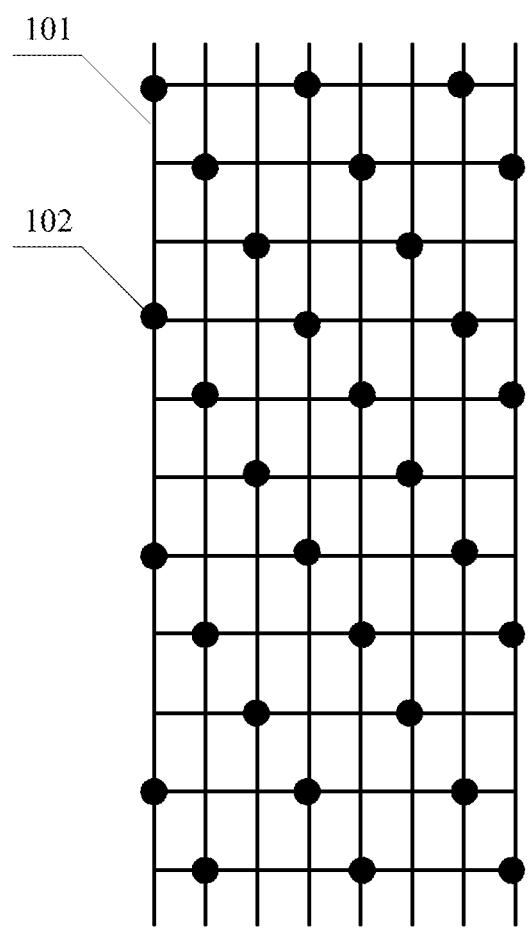
FIG. 6b is a schematic structural diagram in which the first via holes are separated by three pixel units.
Figure 6C:
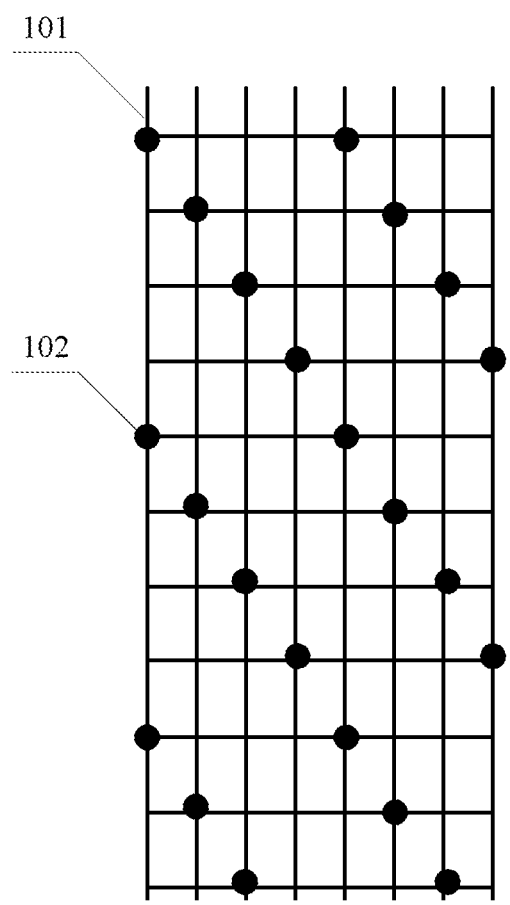
FIG. 6c is a schematic structural diagram in which the first via holes are separated by four pixel units.

As shown in FIG. 6a to FIG. 6c, each grid represents one pixel unit. As shown in FIG. 6a, in a direction parallel to the touch leads 101, two adjacent first via holes 102 along the same touch lead 101 are separated by two pixel units. As shown in FIG. 6b, in the direction along the touch leads 101, two adjacent first via holes 102 corresponding to the same touch lead 101 are separated by three pixel units. And as shown in FIG. 6c, in the direction along the touch leads 101, two adjacent first via holes 102 corresponding to the same touch lead 101 are separated by four pixel units.

Further, the greater the number of the pixel units between two adjacent first via holes 102 is, the lower the density of the first via holes 102 is. However, the number of the pixel units between the two adjacent first via holes 102 is preferably eight by considering manufacture process and other factors. That is, in the direction perpendicular to the array substrate, the projection of two adjacent first via holes 102 electronically connected to the same touch lead 101 is separated by the projection of eight pixel units, i.e., two adjacent first via holes 102 along the direction in which the touch leads 101 extends are separated by eight pixel units, thereby the number and density of the first via holes 102 are further decreased.

As shown in FIG. 4, the first via holes 102 corresponding to two adjacent touch leads 101 are staggered. That is, a first via hole 102 corresponding to one touch lead 101 is between two adjacent first via holes 102 corresponding to another touch lead 101 adjacent to the one touch lead 101. Hence, the uniformity of a distribution of the first via holes 102 is improved, and the problem streaks visible to human eyes occurs in screen display is avoided.

According to the array substrate provided in the embodiment, the touch lead is electronically connected to the self-capacitive electrodes corresponding to the touch lead via the first via hole, at least one of the touch leads is continuous and passes through the common electrode layer, and in the direction perpendicular to the array substrate the projection of two adjacent first via holes electronically connected to the same touch lead is separated by the projection of at least two pixel units. In this way, the problem that streaks or black spots visible to human eyes occurs in screen display due to a large number or high density of the first via holes is solved by decreasing the number and density of the first via holes.

Figure 7:
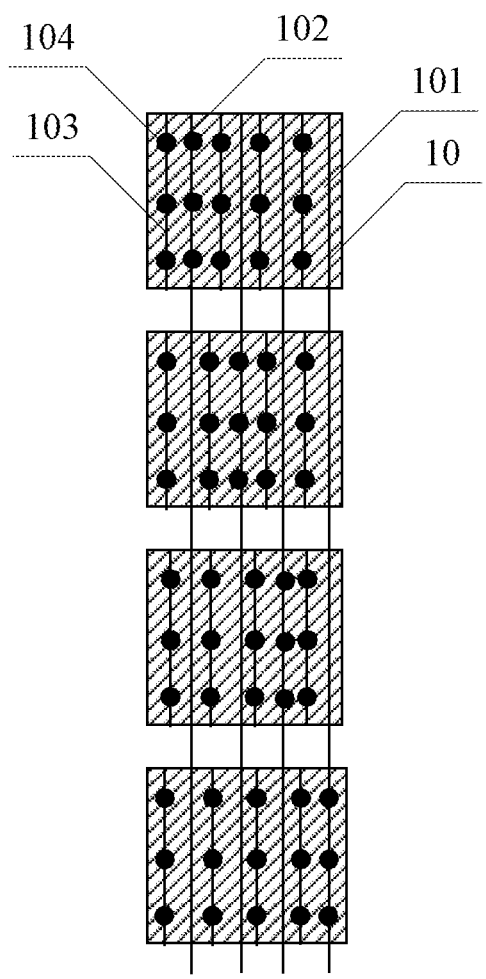
FIG. 7 is a schematic distribution diagram of first via holes and second via holes in an array substrate according to another embodiment of the disclosure.

Besides the above touch leads 101 and the first via holes 102 separated by at least two pixel units, an array substrate according to another embodiment of the disclosure further includes an auxiliary electrode line 103. The auxiliary electrode line 103 is electronically connected to the self-capacitive electrode 10 via a second via hole 104 to decrease the resistance of the self-capacitive electrode. As shown in FIG. 7, in a direction perpendicular to the array substrate, projections of the auxiliary electrode lines 103 disposed on different self-capacitive electrodes 10 are discontinuous line segments. That is, the auxiliary electrode lines 103 on different self-capacitive electrodes 10 are separated from each other.

Figure 8:
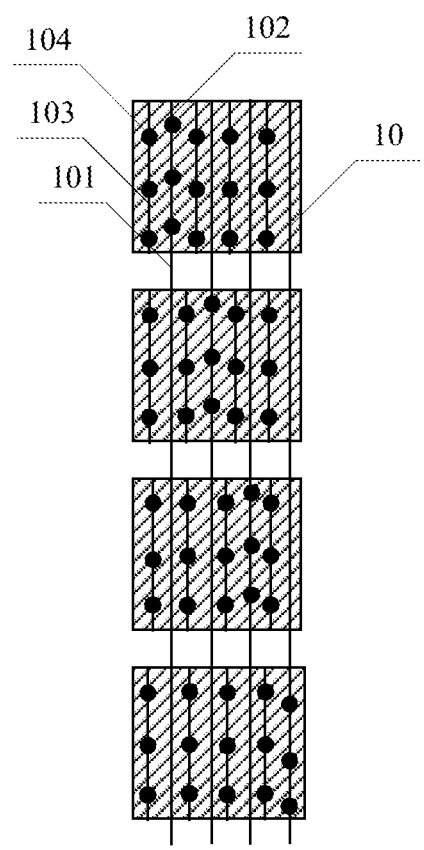
FIG. 8 is a schematic distribution diagram of first via holes and second via holes in an array substrate according to another embodiment of the disclosure.
Figure 9:
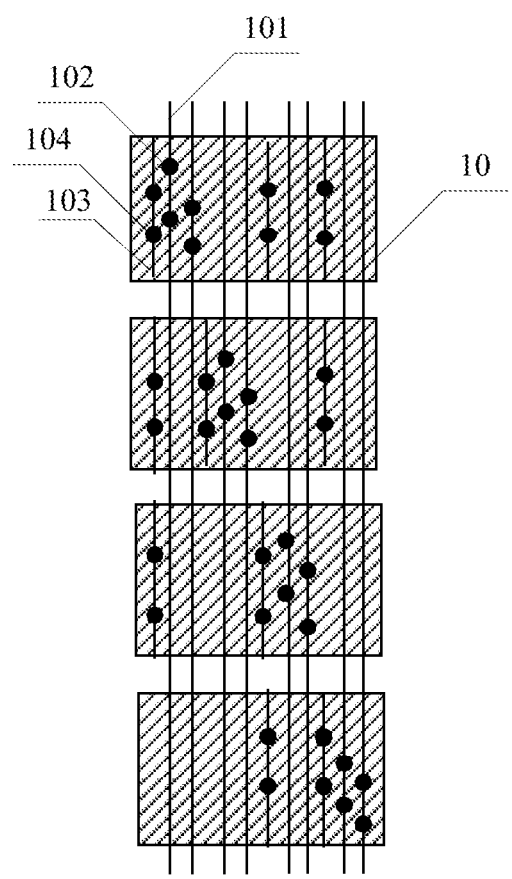
FIG. 9 is a schematic distribution diagram of first via holes and second via holes in an array substrate according to another embodiment of the disclosure.
Figure 10:
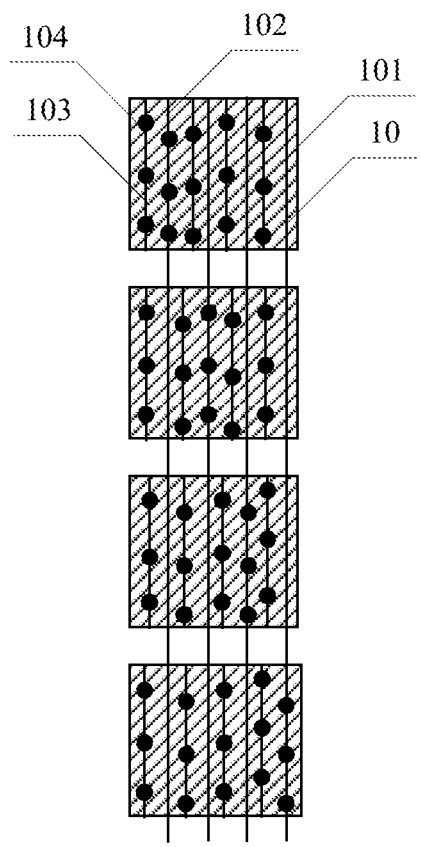
FIG. 10 is a schematic distribution diagram of first via holes and second via holes in an array substrate according to another embodiment of the disclosure.

Further, as shown in FIG. 8, one self-capacitive electrode 10 is electronically connected to one touch lead 101, and within the same self-capacitive electrode, the first via holes 102 on one touch lead 101 are aligned staggered to the second via holes 104 on an adjacent auxiliary electrode line 103. As shown in FIG. 9, one self-capacitive electrode 10 is electronically connected to at least two touch leads 101, and within the same self-capacitive electrode, the first via holes 102 on one touch lead 101 are aligned staggered to the second via holes 104 on an adjacent auxiliary electrode line 103. As shown in FIG. 10, within the same self-capacitive electrode, the second via holes 104 on one auxiliary electrode line 103 are aligned staggered to the second via holes 104 on an adjacent auxiliary electrode line.

In order to avoid the problem that streaks visible to human eyes occurs due to a large number or high density of the second via holes 104, in the direction perpendicular to the array substrate, projections of two adjacent second via holes 104 electronically connected to a same auxiliary electrode line 103 are separated by a projection of at least two pixel units. That is, in the direction in which the auxiliary electrode line 103 extends, two adjacent second via holes 104 are separated by at least two pixel units, thereby reducing the number and density of the second via holes 104.

Further, in the direction perpendicular to the array substrate, projections of two adjacent second via holes 104 electronically connected to the same auxiliary electrode line 103 are separated by the projection of eight pixel units. That is, in the direction in which the auxiliary electrode line 103 extends, two adjacent second via holes 104 are separated by eight pixel units.

Optionally, in other embodiments of the disclosure, the problem that streaks visible to human eyes occurs in screen display may be solved by distributing uniformly the first via holes 102 and the second via holes 104. For example, auxiliary electrode lines 103 are distributed uniformly on the self-capacitive electrodes 10, and touch leads 10 are distributed uniformly between the auxiliary electrode lines 103. In this way, the first via holes 102 and the second via holes 104 are distributed uniformly and the number of the first via holes 102 and the second via holes 104 are staggered and decreased in density, so that the problem that streaks visible to human eyes occurs may be solved.

According to the array substrate provided in the embodiment, the touch lead 101 is electronically connected to the self-capacitive electrode 10 corresponding to the touch lead 101 via the first via hole. 102 The auxiliary electrode line 103 is electronically connected to the self-capacitive electrode 10 via a second via hole 104 to decrease the resistance of the self-capacitive electrode. At least one of the touch leads is continuous and passes through the common electrode layer 10. In the direction perpendicular to the array substrate, two adjacent first via holes 102 are separated by at least two pixel units, and two adjacent second via holes are separated by at least two pixel units. In this way, the problem that streaks or black spots visible to human eyes occurs in screen display due to a large number or high density of the via holes is solved by decreasing the number staggering and density of the first via holes and the second via holes.

Figure 11:
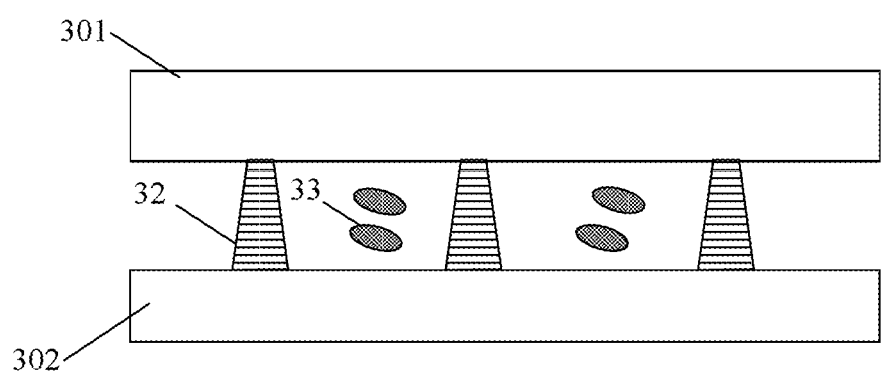
FIG. 11 is a schematic cross sectional view of a structure of a touch display panel according to an embodiment of the disclosure.

A touch display panel is also provided according to an embodiment of the disclosure. As shown in FIG. 11, the touch display panel includes a color filter substrate 302, an array substrate 301 (including all parts from 50 and 20) disposed opposite to the color filter substrate 302, and a liquid crystal layer 33 between the color filter substrate 302 and the array substrate 301. The array substrate 301 may be the array substrate provided by any of the above embodiments. When the touch display panel is subjected to an external force, the liquid crystal is pushed around and thus the thickness of the liquid crystal layer may become uneven, which may cause display failure. Therefore, photo spacers (PSs) 32 are provided between the color filter substrate 302 and the array substrate 301. However, the inventor has found that if the photo spacers are disposed on the via holes of the array substrate, the photo spacers can easily slide and change their position when the touch display panel is subjected to external pressing stress. Therefore, in the embodiment of the present disclosure, the photo spacers are not disposed on the first via holes 102 and/or the second via holes 104 of the array substrate, that is, in the direction perpendicular to the array substrate 301, the photo spacers do not overlap the first via holes 102 and/or the second via holes 104. The position of the photo spacers in the touch display panel will be described in detail below in combination with FIGS. 12-14.

Figure 12:
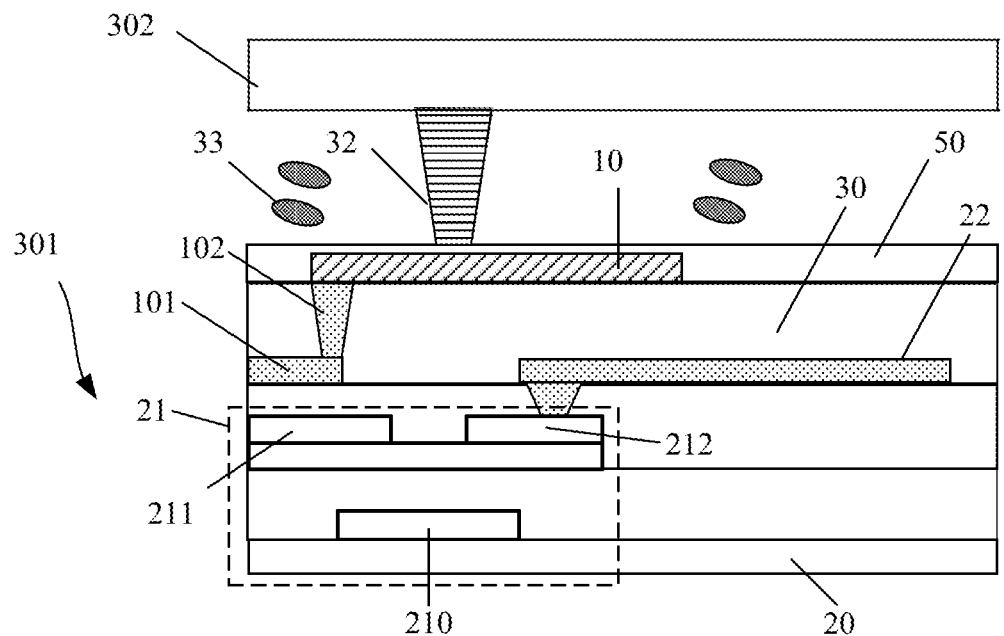
FIG. 12 is a schematic cross sectional view of a structure of a touch display panel according to another embodiment of the disclosure.

Reference is made to FIG. 12, which is a schematic cross sectional view of a structure of a touch display panel according to an embodiment of the disclosure. The touch display panel includes a color filter substrate 302, an array substrate 301 (including all parts from 50 and 20) disposed opposite to the color filter substrate 302, and a liquid crystal layer 33 between the color filter substrate 302 and the array substrate 301. The array substrate 301 shown in FIG. 12 is similar to that shown in FIG. 3. The pixel electrode 22 is between the thin film transistor 21 and the common electrode layer i.e. the self-capacitive electrode 10, and an insulating layer 30 is between the common electrode layers i.e. the self-capacitive electrode 10 and the pixel electrode 22. FIG. 12 further shows an insulating layer 50 on the self-capacitive electrode 10. The skilled in the art can understand that the array substrate 301 may have other structure, for example, similar to that shown in FIG. 2, that is, the common electrode layer i.e. the self-capacitive electrode 10 is between the thin film transistor 21 and the pixel electrode 22, and the insulating layer 30 is between the common electrode layers i.e. the self-capacitive electrode 10 and the pixel electrode 22. In the embodiment of the present disclosure, the photo spacers (PSs) 32 are not disposed on the first via holes 102 of the array substrate, that is, in the direction perpendicular to the array substrate 301, the photo spacers (PSs) 32 do not overlap the first via holes 102, to avoid that the photo spacers 32 slide and change their position when the touch display panel is subjected to external pressing stress.

Figure 13:
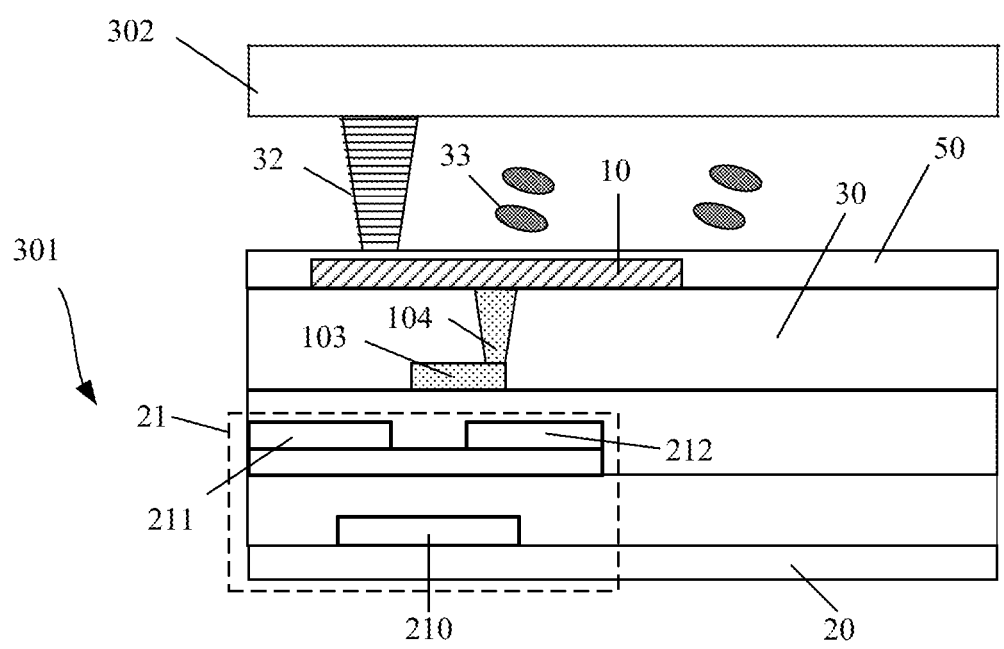
FIG. 13 is a schematic cross sectional view of a structure of a touch display panel according to another embodiment of the disclosure.

Reference is made to FIG. 13, which is a schematic cross sectional view of a structure of a touch display panel according to another embodiment of the disclosure. The touch display panel of this embodiment is similar to that of the embodiment of FIG. 12 (the touch lead, the first via hole and the pixel electrode are not shown in FIG. 13 for simplicity), except that the array substrate further includes auxiliary electrode lines 103 and second via holes 104. In the embodiment of the present disclosure, the photo spacers 32 are not disposed on the second via holes 104 of the array substrate, that is, in the direction perpendicular to the array substrate 301, the photo spacers 32 do not overlap the second via holes 104, to avoid that the photo spacers 32 slide and change their position when the touch display panel is subjected to external pressing stress.

Figure 14:
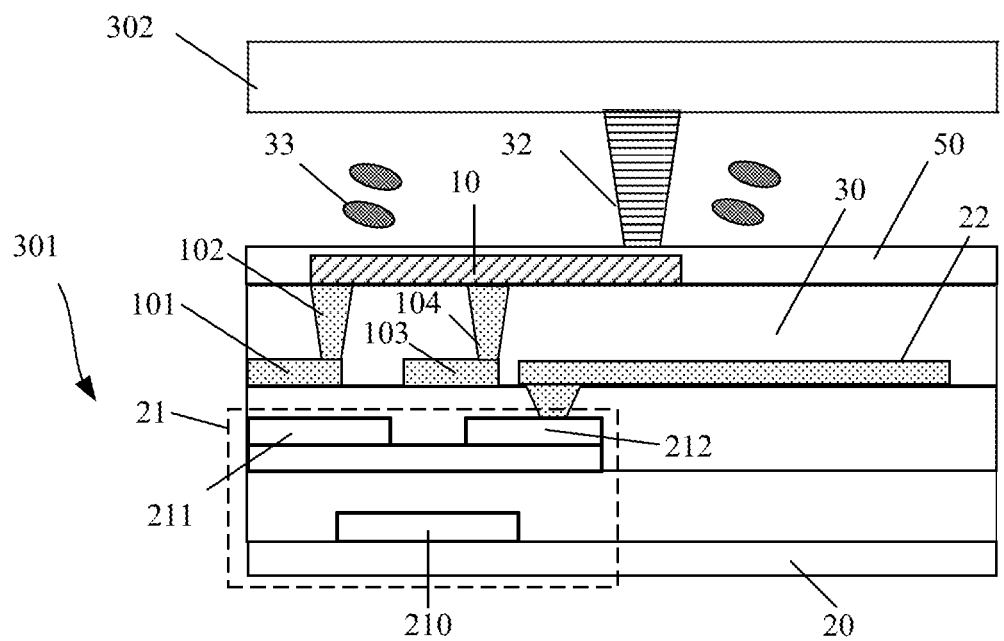
FIG. 14 is a schematic cross sectional view of a structure of a touch display panel according to another embodiment of the disclosure.

Reference is made to FIG. 14, which is a schematic cross sectional view of a structure of a touch display panel according to another embodiment of the disclosure. The touch display panel of this embodiment is similar to that of the embodiment of FIG. 12, except that the array substrate further includes auxiliary electrode lines 103 and second via holes 104. In the embodiment of the present disclosure, the photo spacers are not disposed on the first via holes 102 and the second via holes 104 of the array substrate, that is, in the direction perpendicular to the array substrate 301, the photo spacers do not overlap the first via holes 102 and the second via holes 104, to avoid that the photo spacers slide and change their position when the touch display panel is subjected to external pressing stress.

It is also provided according to the embodiment of the disclosure a touch display device including the above touch display panels.

According to the touch display panel and the touch display device provided in the embodiment, in the direction perpendicular to the array substrate, the projection of one first via hole is covered by at least the projections of two pixel units. In this way, the problem that streaks visible to human eyes occurs in screen display due to a large number or high density of the first via holes is solved by reducing the number and density of the first via holes.

The embodiments of the present invention are described herein in a progressive manner, with the emphasis of each of the embodiments on the difference between it and the other embodiments; hence, for the same or similar parts between the embodiments, one can refer to various embodiments. The description of the embodiments herein enables those skilled in the art to implement or use the present invention. Numerous modifications to the embodiments will be obvious to those skilled in the art, and the general principle herein can be implemented in other embodiments without deviation from the essence or scope of the present invention. Therefore, the present invention will not be limited to the embodiments described herein, but in accordance with the widest scope consistent with the principle and novel features disclosed herein.

What is claimed is:

1. A touch display panel comprising an array substrate, a color filter substrate and a plurality of photo spacers between the array substrate and the color filter substrate, wherein the array substrate comprises:
   a plurality of pixel units each comprising a thin film transistor (TFT), wherein each of the pixel units has a side length;
   a common electrode layer disposed over the plurality of pixel units, wherein the common electrode layer is divided into columns of self-capacitive electrodes, wherein each self-capacitive electrode overlaps with more than one pixel units in a direction perpendicular to the array substrate;
   a drive circuit; and
   a plurality of touch leads electrically connected to the drive circuit, wherein the plurality of touch leads each is disposed parallel to and connected with one of the columns of the self-capacitive electrodes through at least two first via holes, wherein an interval between said two first via holes connected with a same touch lead is greater than or equal to twice the side lengths;
   wherein, within a same self-capacitive electrode, the first via holes connected with one touch lead are aligned staggered to the first via holes connected with an adjacent touch lead, and
   none of the plurality of photo spacers overlap with the first via holes in the direction perpendicular to the array substrate.

2. The touch display panel according to claim 1, wherein the array substrate further comprises:
   a plurality of auxiliary electrode lines each connecting electrically to one self-capacitive electrode in said column via a plurality of second via holes, wherein the first via holes connected with one touch lead are aligned staggered to the second via holes connected with an adjacent one of the plurality of auxiliary electrode lines.

3. The touch display panel according to claim 1, wherein the plurality of touch leads each crosses over at least one column of the self-capacitive electrodes.

4. The touch display panel according to claim 2, an interval between two adjacent second via holes connected with a same one of the plurality of auxiliary electrode lines is greater than or equal to twice side lengths.

5. The touch display panel according to claim 2, wherein the first via holes and the second via holes are distributed uniformly on each of the columns of self-capacitive electrodes.

6. The touch display panel according to claim 5, wherein the plurality of auxiliary electrode lines is distributed uniformly among the columns of the self-capacitive electrodes, and wherein the touch leads are distributed uniformly among the plurality of auxiliary electrode lines.

7. The touch display panel according to claim 1, wherein the array substrate further comprises a plurality of pixel electrodes, wherein the touch leads are disposed in a same layer as the pixel electrodes.

8. The touch display panel according to claim 7, wherein the pixel electrodes are disposed between the common electrode layer and the array substrate.

9. The touch display panel according to claim 7, wherein the common electrode layer is disposed between the pixel electrodes and the array substrate.

10. The touch display panel according to claim 4, wherein the interval between two adjacent first via holes connected with the same touch lead is equal to a sum of the side lengths of eight pixel units, and wherein the interval between two adjacent second via holes connected with the same auxiliary electrode line is equal to eight side lengths.

11. The touch display panel according to claim 2, wherein the second via holes connected with one auxiliary electrode line are aligned staggered to the second via holes connected with one adjacent auxiliary electrode line located within the same self-capacitive electrode.

12. The touch display panel according to claim 3, wherein the array substrate further comprises a plurality of auxiliary electrode lines each connecting electrically to the one said self-capacitive electrode via a plurality of second via holes, wherein each of the auxiliary electrode lines overlaps with only one of the self-capacitive electrodes.

13. The touch display panel according to claim 2, wherein none of the plurality of photo spacers overlaps with the second via holes in the direction perpendicular to the array substrate.

14. A touch display device comprising a touch display panel, wherein the touch display panel comprises an array substrate, a color filter substrate and a plurality of photo spacers between the array substrate and the color filter substrate, and the array substrate comprises:
  a plurality of pixel units each comprising a thin film transistor (TFT) and having a side length;
  a common electrode layer disposed over the plurality of pixel units, wherein the common electrode layer is divided into columns of self-capacitive electrodes, wherein each self-capacitive electrode overlaps with more than one pixel units in a direction perpendicular to the array substrate;
  a drive circuit; and
  a plurality of touch leads electrically connected to the drive circuit, wherein each of the plurality of touch leads is disposed parallel to and connected with one of the columns of the self-capacitive electrodes through at least two first via holes, wherein an interval between two adjacent first via holes connected with a same touch lead is greater than or equal to twice the side length of one of the pixel units, and
wherein, within a same self-capacitive electrode, the first via holes connected with one touch lead are aligned staggered to the first via holes connected with an adjacent touch lead; and
none of the plurality of photo spacers overlaps with the first via holes in the direction perpendicular to the array substrate.

* * * * *